(12) United States Patent
Ki et al.

(10) Patent No.: US 11,388,859 B2
(45) Date of Patent: Jul. 19, 2022

(54) AUXILIARY WHEEL FOR LAWN MOWER

(71) Applicant: LS MTRON LTD., Anyang-si (KR)

(72) Inventors: Jung Sik Ki, Anyang-si (KR); Jae Seop Park, Anyang-si (KR); Gi Myeong Park, Anyang-si (KR); Dong Joo Kim, Anyang-si (KR); Jong Han Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 442 days.

(21) Appl. No.: 16/732,517

(22) Filed: Jan. 2, 2020

(65) Prior Publication Data
US 2020/0214211 A1 Jul. 9, 2020

(30) Foreign Application Priority Data

Jan. 3, 2019 (KR) .......................... 10-2019-0000928
Oct. 15, 2019 (KR) .......................... 10-2019-0127594

(51) Int. Cl.
| B60B 33/00 | (2006.01) |
| A01D 75/18 | (2006.01) |
| A01D 34/64 | (2006.01) |
| A01D 101/00 | (2006.01) |

(52) U.S. Cl.
CPC ........... *A01D 75/185* (2013.01); *A01D 34/64* (2013.01); *A01D 2101/00* (2013.01)

(58) Field of Classification Search
CPC . B60B 33/00; B60B 33/0005; B60B 33/0018; B60B 33/0021; B60B 33/06
See application file for complete search history.

(56) References Cited

U.S. PATENT DOCUMENTS

| 4,291,522 A | 9/1981 | Kawakaki et al. |
| 4,543,685 A * | 10/1985 | Kassai ............... B60B 33/0078 16/35 R |
| 4,649,596 A * | 3/1987 | Kassai ............... B60B 33/0078 16/35 R |
| 4,763,910 A * | 8/1988 | Brandli .............. B60B 33/0042 280/47.16 |

(Continued)

FOREIGN PATENT DOCUMENTS

| CN | 108040585 A | 5/2018 |
| JP | 2012090531 A | 5/2012 |

(Continued)

OTHER PUBLICATIONS

Korean Office Action for related Korean Application No. 10-2019-0127594; action dated Nov. 26, 2019; (5 pages).

*Primary Examiner* — Toan C To
(74) *Attorney, Agent, or Firm* — K&L Gates LLP

(57) ABSTRACT

The present invention relates to an auxiliary wheel for a lawn mower which includes an installation unit coupled to a main body of a lawn mower, a swing unit coupled to the installation unit to be swingable in one direction or the other direction, a wheel unit connected to the swing unit to be swingable with the swing unit, and a fixing unit installed on an outer portion of the installation unit and configured to fix the swing unit to be swingable in the other direction. When the wheel unit swings in the one direction, the main body is pressed against the ground, and when the wheel unit swings in the other direction, the main body is spaced apart from the ground.

18 Claims, 12 Drawing Sheets

(56) References Cited

U.S. PATENT DOCUMENTS

| | | | | |
|---|---|---|---|---|
| 5,575,348 A * | 11/1996 | Goertzen | ............. | A61G 5/1078 180/65.6 |
| 5,628,377 A * | 5/1997 | Le Gloan | ............ | B60G 21/0551 280/124.152 |
| 5,848,658 A * | 12/1998 | Pulver | ................... | B60G 15/06 180/907 |
| 6,394,738 B1 * | 5/2002 | Springer | ................ | B62D 49/08 414/673 |
| 6,539,578 B1 * | 4/2003 | Guttmann | ........... | B60B 33/0049 16/44 |
| 6,543,798 B2 * | 4/2003 | Schaffner | ............. | A61G 5/1089 280/755 |
| 6,588,799 B1 * | 7/2003 | Sanchez | ................. | B62D 37/00 280/755 |
| 6,712,369 B2 * | 3/2004 | Wu | ........................ | A61G 5/043 280/124.1 |
| 8,469,383 B2 * | 6/2013 | Zhou | .................... | A61G 5/1078 180/209 |
| 9,956,822 B1 * | 5/2018 | Yu | ....................... | B60B 33/0042 |
| 10,226,392 B2 * | 3/2019 | Chiang | ................. | A61G 5/043 |
| 10,518,578 B1 * | 12/2019 | Spektor | .................. | B60B 33/06 |
| 11,213,441 B2 * | 1/2022 | Goertzen | ............. | B60G 17/016 |
| 2004/0262859 A1 * | 12/2004 | Turturiello | ............... | A61G 5/06 280/5.515 |
| 2006/0163543 A1 * | 7/2006 | Kobacker | ............... | B66F 15/00 254/131 |
| 2007/0028577 A1 | 2/2007 | Clement et al. | | |
| 2007/0143957 A1 * | 6/2007 | Baek | ..................... | B60B 33/045 16/44 |
| 2007/0215414 A1 * | 9/2007 | Chiang | ............... | B60B 33/0021 188/1.12 |
| 2015/0033500 A1 * | 2/2015 | Block | ................ | B60B 33/0005 16/45 |
| 2019/0008710 A1 * | 1/2019 | Wilson | ................. | A61G 7/1025 |
| 2020/0085651 A1 * | 3/2020 | Menig | ................. | A61G 5/1051 |
| 2020/0206047 A1 * | 7/2020 | Goertzen | ............. | B60G 17/016 |
| 2021/0061004 A1 * | 3/2021 | Langenfeld | ......... | B60B 33/0049 |

FOREIGN PATENT DOCUMENTS

| | | |
|---|---|---|
| JP | 2016123315 A | 7/2016 |
| KR | 20120118709 A | 10/2012 |

* cited by examiner

AUXILIARY WHEEL FOR LAWN MOWER

PRIORITY STATEMENT

Pursuant to 35 U.S.C. § 119(a), this application claims the benefit of earlier filing date and right of priority to Korean Patent Application No. 10-2019-0000928, filed on Jan. 3, 2019 and Korean Patent Application No. 10-2019-0127594, filed Oct. 15, 2019, the disclosures of which are incorporated herein by reference in its entirety.

FIELD OF TECHNOLOGY

The present invention relates to an auxiliary wheel for a lawn mower coupled to a lawn mower.

BACKGROUND

Lawn mowers are devices for trimming grass planted in a home yard or a playground. The lawn mowers are classified into home use lawn mowers used in homes and a tractor-type lawn mowers used in a large playground or a large farm.

FIG. 1 is a schematic side view illustrating a lawn mower according to a related art, Korean Registered Patent No. 10-1339555 (Registered on Dec. 3, 2013).

Referring to FIG. 1, a lawn mower 10 according to the related art is mounted on a lower portion of a work vehicle such as a tractor. The lawn mower 10 according to the related art includes a main body 11 to be mounted on a lower portion of the work vehicle and an auxiliary wheel 12 to be coupled to the main body 11.

The lawn mower 10 according to the related art may be mainly classified into two types according to a method of positioning the lawn mower 10 below the work vehicle. First, there may be a so-called side-loading lawn mower 10 which is located at a lateral side of the stopped work vehicle and pushed to be positioned below the work vehicle. Further, there may be a so-called drive-over lawn mower 10 which is positioned on the ground and then is positioned below the work vehicle by driving a work vehicle over the lawn mower 10.

In the latter drive-over lawn mower, an operation in which the lawn mower 10 is fixed to the ground is required so that the lawn mower 10 is not pushed by the work vehicle while the work vehicle drives over the lawn mower 10.

However, conventionally, since an element for fixing the lawn mower 10 to the ground is not provided, it is difficult to mount the lawn mower 10 to a lower portion of the work vehicle

SUMMARY

Therefore, the present invention is designed to solve the problems and is to provide an auxiliary wheel for a lawn mower that is capable of solving a problem in which it is difficult to mount a lawn mower on a lower portion of a work vehicle.

To solve the above problems, the present invention may include the following configurations.

An auxiliary wheel for a lawn mower according to the present invention includes an installation unit coupled to a main body of a lawn mower, a swing unit coupled to the installation unit to be swingable in one direction or the other direction, a wheel unit connected to the swing unit to be swingable with the swing unit, and a fixing unit installed on an outer portion of the installation unit and configured to fix the swing unit swung in the other direction. When the wheel unit swings in the one direction, the main body may be pressed against the ground. When wheel unit swings in the other direction, the main body may be spaced apart from the ground. The swing unit includes a swingable body part coupled to the installation unit to be swingable about the swing shaft in the one direction or the other direction and having one end connected with the wheel unit, and a swing fixing groove formed in the swingable body part. The fixing unit is inserted into the swing fixing groove to fix the swing unit swung in the other direction or comes out of the swing fixing groove to release fixing of the swing unit.

According to the present invention, an auxiliary wheel for a lawn mower may have the following effects.

Because the present invention is implemented so that a work vehicle can easily move while a lawn mower is mounted thereon and can also improve easiness of an operation in which the lawn mower is mounted on a lower portion of the work vehicle.

DETAILED DESCRIPTION

Figure 1:
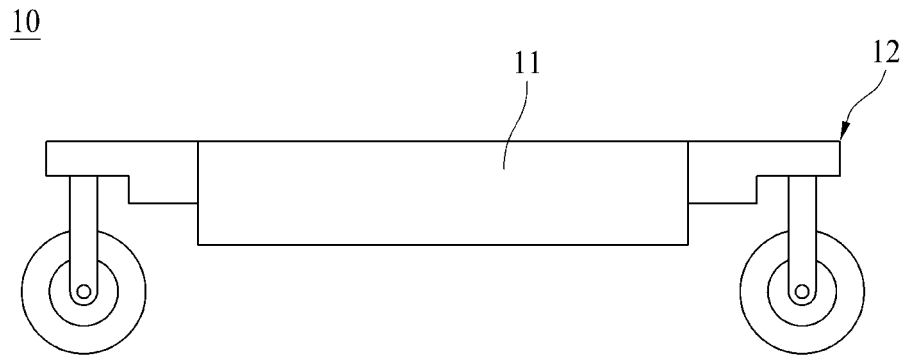
FIG. 1 is a schematic side view illustrating a lawn mower according to a related art.

Hereinafter, an auxiliary wheel for a lawn mower according to embodiments of the present invention will be described below in detail with reference to the accompanying drawings.

Referring to FIGS. 2 to 5, an auxiliary wheel 1 for a lawn mower according to the present invention is provided on a lawn mower 100 mounted on a lower portion of a work vehicle (not shown) such as a tractor.

The auxiliary wheel 1 for a lawn mower according to the present invention includes an installation unit 2 coupled to a main body 200 of the lawn mower 100, a wheel unit 3 supported on the ground G, a swing unit 4 coupled to the installation unit 2 to be swingable, and a fixing unit 5 selectively fixing the swing unit 4.

The wheel unit 3 is connected to the swing unit 4 and may swing with the swing unit 4. The swing unit 4 may include a swingable body part 41 and a swing fixing groove 42, wherein the swingable body part 41 is coupled to the installation unit 2 to be swingable about a swing shaft 41a in one direction or the other direction, and the swing fixing groove 42 is formed in the swingable body part 41. When the swingable body part 41 swings in the one direction or the other direction, the wheel unit 3 may also swing about the swing shaft 41a in the one direction or the other direction. Hereinafter, unless stated otherwise, swinging of the swingable body part 41 and the wheel unit 3 in the one direction or the other direction refers to swinging about the swing shaft 41a. The fixing unit 5 may include a fixing pin 51 that selectively fixes the swing unit 4 according to whether the fixing pin 51 is inserted into the swing fixing groove 42. The auxiliary wheel 1 for a lawn mower according to the present invention may be operated as described below.

Figure 5:
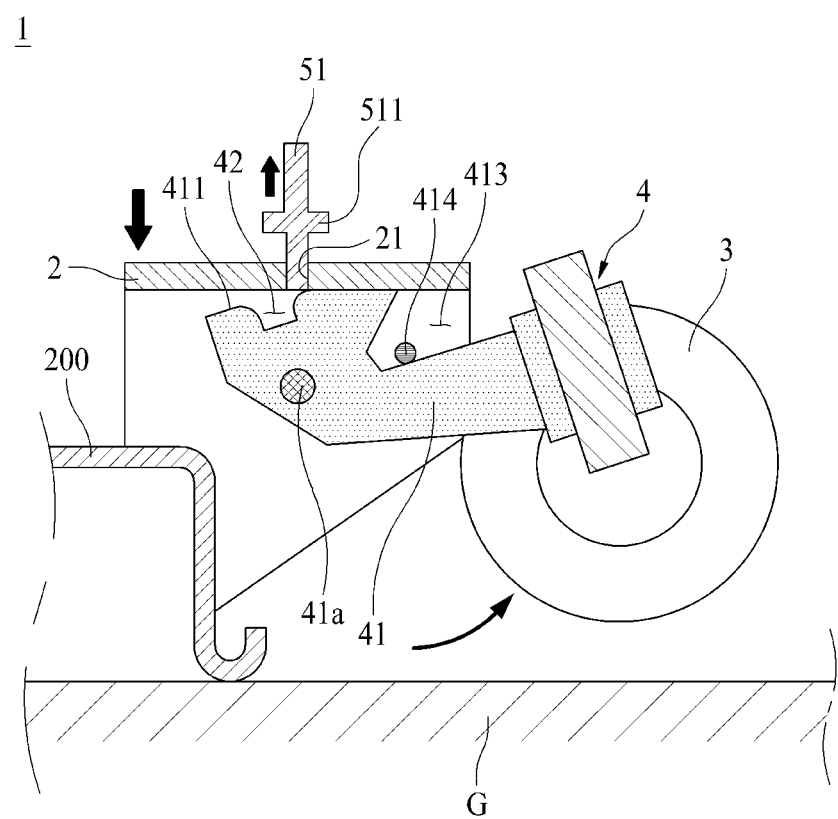

First, as shown in FIG. 5, when the swingable body part 41 and the wheel unit 3 swing in the one direction, the main body 200 is pressed against the ground G, and movement of the main body 200 may be limited due to friction with the ground G. Therefore, a movement distance of the main body 200 may be decreased while the work vehicle drives over the main body 200. Meanwhile, when the fixing pin 51 comes out of the swing fixing groove 42 so that the swing unit 4 is released, the swingable body part 41 and the wheel unit 3 may swing in the one direction due to a weight of the main body 200. The fixing pin 51 may come out of the swingable body part 41 due to an external force applied by an operator.

Figure 4:
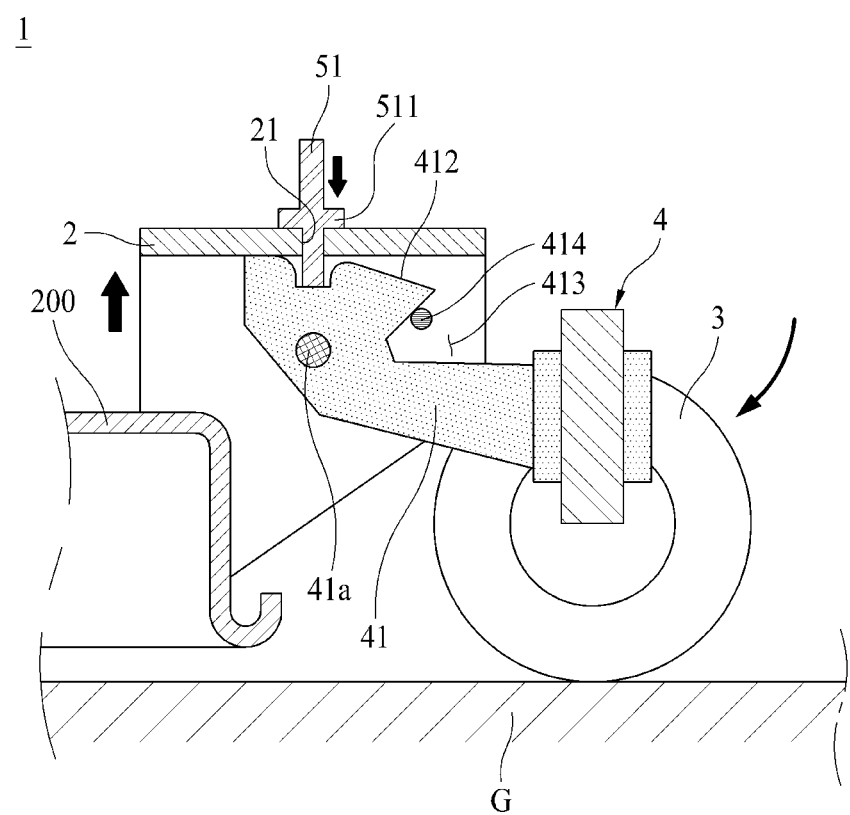
FIGS. 4 to 11 are schematic side cross-sectional views illustrating the auxiliary wheel for a lawn mower according to the present invention taken along line I-I in FIG. 3.

Next, as shown in FIG. 4, when the swingable body part 41 and the wheel unit 3 swing in the other direction, the main body 200 may be spaced apart from the ground G. Therefore, the work vehicle may easily move while being mounted on the lawn mower 100. Meanwhile, when the swingable body part 41 and the wheel unit 3 swing in the other direction, the fixing pin 51 may be inserted into the swing fixing groove 42. Therefore, the fixing pin 51 may fix the swing unit 4 swung in the other direction. The swingable body part 41 and the wheel unit 3 may swing in the other direction due to an external force applied by the operator.

Thus, the auxiliary wheel 1 for a lawn mower according to the present invention can improve easiness of an operation in which the lawn mower 100 is mounted on a lower portion of the work vehicle using the fixing unit 5 and can be implemented to easily move the work vehicle while being mounted with the lawn mower 100.

Hereinafter, the installation unit 2, the wheel unit 3, the swing unit 4, and the fixing unit 5 will be described in detail with reference to the accompanying drawings.

Figure 2:
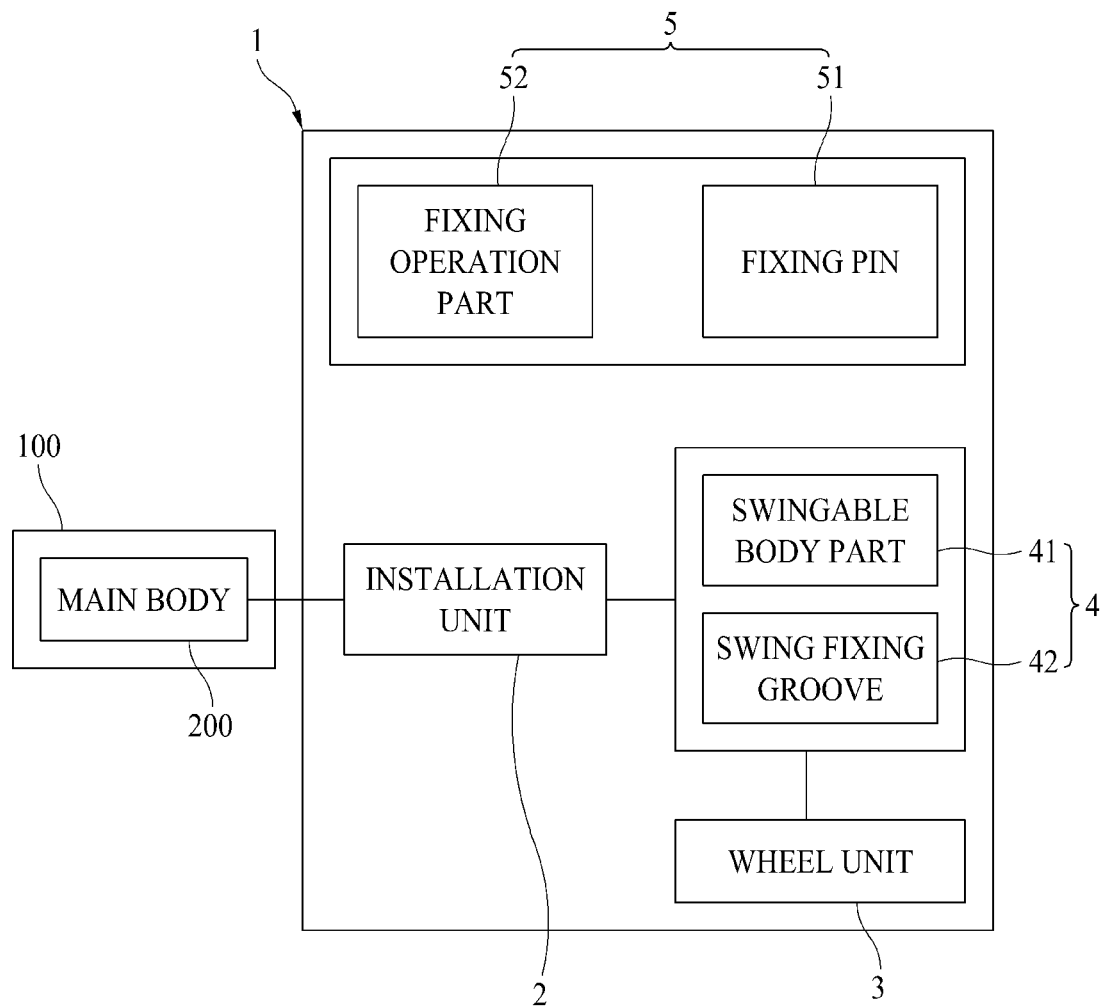
FIG. 2 is a schematic block diagram illustrating an auxiliary wheel for a lawn mower according to the present invention.
Figure 3:
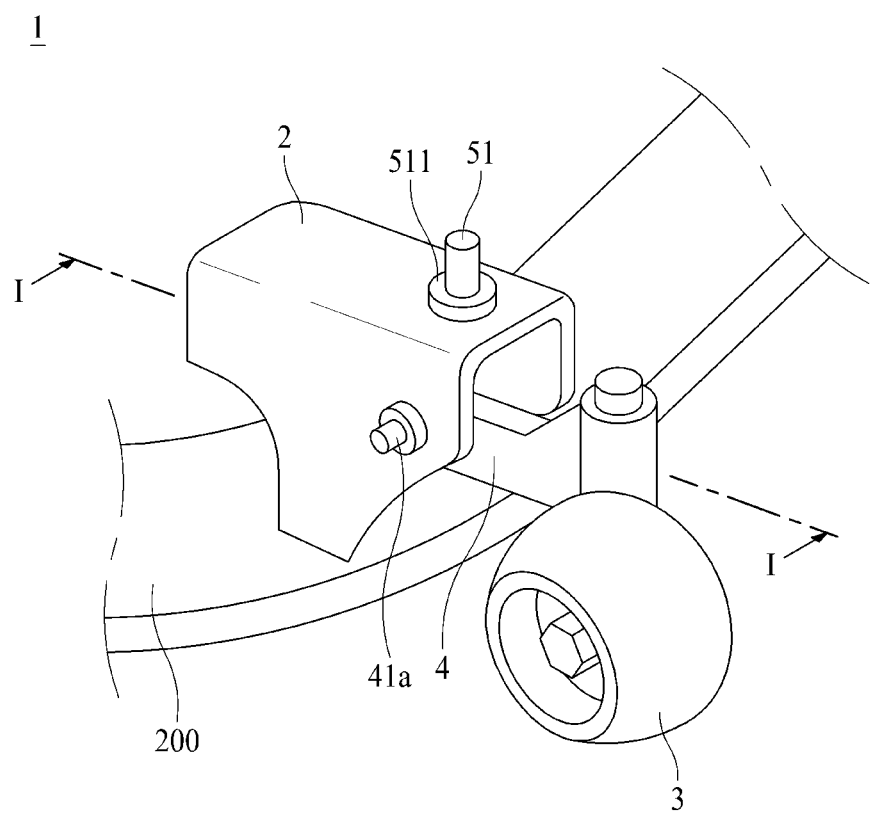
FIG. 3 is a schematic perspective view illustrating the auxiliary wheel for a lawn mower according to the present invention.

Referring to FIGS. 2 and 3, the installation unit 2 may be coupled to the main body 200. The swing unit 4 and the fixing unit 5 may be coupled to the installation unit 2. The interior of the installation unit 2 may be formed to be empty. The swing unit 4 may swing through the empty interior of the installation unit 2 in the one direction or the other direction.

Referring to FIGS. 2 and 3, the wheel unit 3 is connected with the swing unit 4. The wheel unit 3 may be connected to the swingable body part 41 to be swingable.

Referring to FIGS. 2 to 5, the swing unit 4 is coupled to the installation unit 2 to be swingable. The swing unit 4 may include a swingable body part 41 and a swing fixing groove 42.

The swingable body part 41 is coupled to the installation unit 2 to be swingable about the swing shaft 41a in the one direction or the other direction. The swing shaft 41a may be formed as a shaft. The wheel unit 3 may be connected to one end portion of the swingable body part 41.

A stop surface 411 (shown in FIG. 5) may be formed on an upper surface of the swingable body part 41. As shown in FIG. 4, when the swing unit 4 swings in the other direction so that the swing unit 4 swings to a position at which the fixing pin 51 corresponds to the fixing groove 42, the stop surface 411 may come into surface contact with an upper portion of the installation unit 2. Since the stop surface 411 is supported on an upper portion of the installation unit 2, the swingable body part 41 may not swing in the other direction. Thus, the stop surface 411 may allow the swing unit 4 not to swing over the position at which the fixing pin 51 corresponds to the swing fixing groove 42. Therefore, the stop surface 411 may increase accuracy of an operation in which a position of the swingable body part 41 is arranged such that the fixing pin 51 is easily inserted into the swing fixing groove 42. The stop surface 411 may be formed as a flat surface. A portion at which the swingable body part 41 is connected to the swing fixing groove 42 may be formed to have a curved surface.

A limiting surface 412 (shown in FIG. 4) may be formed on an upper surface of the swingable body part 41. As shown in FIG. 5, when the swing unit 4 swings in the one direction so that the swing unit 4 swings to a predetermined position, the limiting surface 412 may come into surface contact with an upper portion of the installation unit 2. The predetermined position may refer to a position of the swing unit 4 when the main body 200 is supported on the ground G. Since the limiting surface 412 is supported on an upper portion of the installation unit 2, the swingable body part 41 may not swing in the one direction. Therefore, the limiting surface 412 may allow the swing unit 4 not to swing excessively in the one direction. Therefore, since the main body 200 is supported on the ground G and the swing unit 4 swings in the one direction, damage to the swing unit 4 can be prevented. The limiting surface 412 may be formed as a flat surface. The limiting surface 412 may support the fixing pin 51 that comes out of the swing fixing groove 42. Therefore, when the swing unit 4 swings in the one direction, a state in which the fixing pin 51 comes out of the swing fixing groove 42 may be maintained. A portion of the swingable body part 41 at which the limiting surface 412 is connected to the swing fixing groove 42 may be formed as a curved surface.

A stop groove 413 may be formed in the swingable body part 41. In this case, a stop bar 414 may be coupled to the installation unit 2.

As shown in FIG. 4, when the swing unit 4 swings in the other direction so that the swing unit 4 swings to a position at which the swing fixing groove 42 corresponds to the fixing pin 51, the stop bar 414 may be in contact with the swingable body part 41 in the stop groove 413. Thus, since the swingable body part 41 is supported on the stop bar 414, the swingable body part 41 may not swing in the other direction. Therefore, the stop bar 414 allows the swing unit 4 to swing over the position at which the swing fixing groove 42 corresponds to the fixing pin 51 in the other direction.

As shown in FIG. 5, when the swing unit 4 swings in the one direction to swing to a predetermined position, the stop bar 414 may be in contact with the swingable body part 41 in the stop groove 413. Therefore, since the swingable body part 41 is supported on the stop bar 414, the swingable body part 41 may not swing in the one direction. Therefore, the stop bar 414 may allow the swing unit 4 not to swing excessively in the one direction.

Meanwhile, in each case in which the swing unit 4 swings in the one direction or the swing unit 4 swings in the other direction, the stop bar 414 may be in contact with different portions of the swingable body part 41. For example, when the swing unit 4 swings in the one direction, the stop bar 414 is in contact with one surface of the swingable body part 41, and when the swing unit 4 swings in the other direction, the stop bar 414 may be in contact with the other surface of the swingable body part 41. In this case, the stop bar 414 may be disposed between the one surface and the other surface of the swingable body part 41 in the stop groove 413.

FIGS. 4 and 5 illustrate the swing unit 4 including all of the stop surface 411, the limiting surface 412, the stop groove 413, and the stop bar 414, but the present invention is not limited thereto. The swing unit 4 may include at least one of the stop surface 411, the limiting surface 412, the stop groove 413, and the stop bar 414.

Referring to FIGS. 2 to 5, the swing fixing groove 42 may allow the fixing pin 51 to be selectively inserted thereinto. The swing fixing groove 42 may be formed in the swingable body part 41. When the swing unit 4 swings in the other direction, the swing fixing groove 42 may be disposed at a position corresponding to the fixing pin 51.

Referring to FIGS. 2 to 5, the fixing unit 5 is installed on an outer portion of the installation unit 2 and allows the swing unit 4 to be fixed in a state of swinging in the other direction. The fixing unit 5 may include the fixing pin 51.

The fixing pin 51 is selectively inserted into the swing fixing groove 42 so that the swingable body part 41 is selectively fixed. As shown in FIG. 4, the fixing pin 51 is inserted into the swing fixing groove 42 to fix the swing unit 4 swung in the other direction. In this case, a through hole 21 that corresponds to the fixing pin 51 may be formed in the installation unit 2. The fixing pin 51 may pass through the installation unit 2 through the through hole 21 and be inserted into the swing fixing groove 42. As shown in FIG. 5, the fixing pin 51 comes out of the swing fixing groove 42 and may release fixing of the swing unit 4.

A protrusion part 511 may be coupled to the fixing pin 51. The protrusion part 511 may protrude outward from the fixing pin 51. When the fixing pin 51 is inserted into the swing fixing groove 42 through the through hole 21, the protrusion part 511 is supported on the installation unit 2 to limit a movement distance of the fixing pin 51 in a direction in which the fixing pin 51 is inserted into the swing fixing groove 42. After the protrusion part 511 is manufactured separately from the fixing pin 51, the protrusion part 511 may be coupled to the fixing pin 51. The protrusion part 511 may be a washer. In this case, a supporting pin (not shown) that supports the protrusion part 511 may be additionally coupled to the fixing pin 51. The fixing pin 51 and the protrusion part 511 may be formed integrally.

Referring to FIGS. 2 to 5, the fixing unit 5 may include a fixing operation part 52.

The fixing operation part 52 moves the fixing pin 51 so that the fixing pin 51 fixes the swing unit 4 swung in the other direction or releases fixing of the swing unit 4. The fixing operation part 52 may be operated so that the fixing pin 51 is moved by an external force applied by the operator. The operator may directly apply an external force to the fixing operation part 52 using a hand, a foot, or the like and apply an external force to the fixing operation part 52 using a separate device.

In this case, the auxiliary wheel 1 for a lawn mower according to the present invention may include the fixing operation part 52 according to various embodiments of the present invention. Hereinafter, the fixing operation part 52 according to the embodiments will be described in detail with reference to the accompanying drawings.

Fixing Operation Part According to First Embodiment

Figure 6:
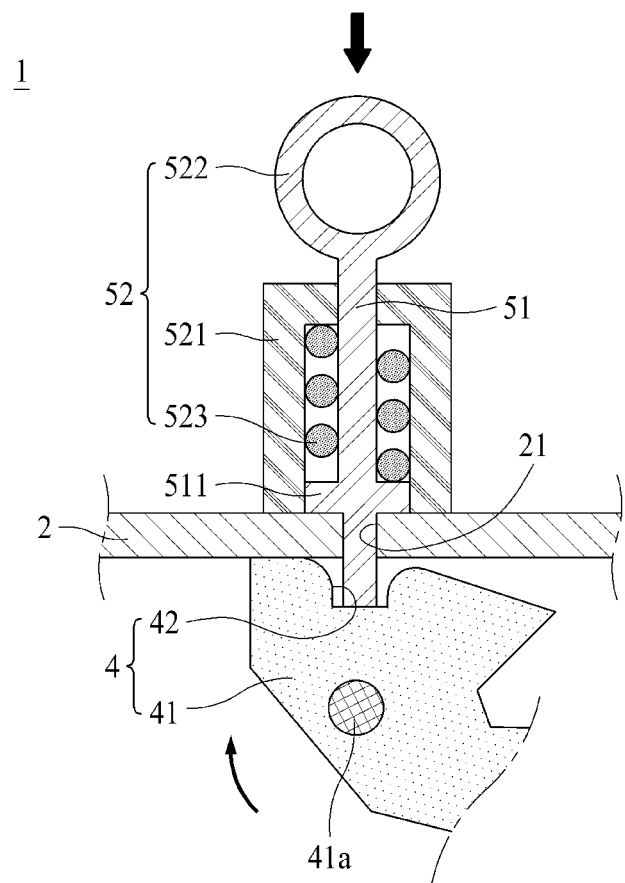
Figure 7:
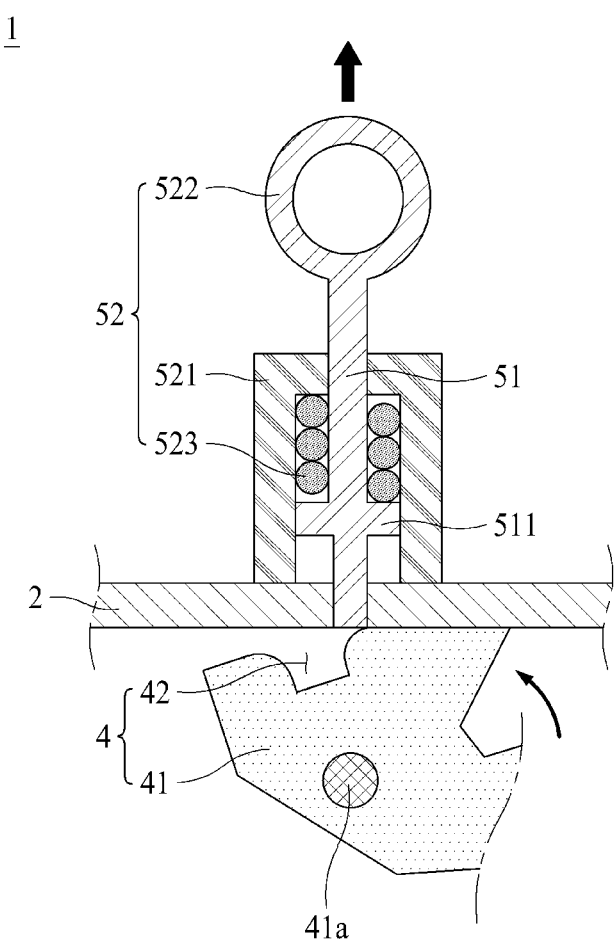

Referring to FIGS. 6 and 7, a fixing operation part 52 according to a first embodiment may include a fixing bracket 521, a force transferring part 522, and a pin-elastic part 523.

The fixing bracket 521 is coupled to an installation unit 2. The fixing bracket 521 may be disposed on an upper side of the installation unit 2.

The force transferring part 522 is connected to a fixing pin 51. The force transferring part 522 and the fixing pin 51 may move together. The force transferring part 522 may be formed in a ring shape. An operator applies an external force to the force transferring part 522 to move the force transferring part 522, and thus the fixing pin 51 moves. The force transferring part 522 may be disposed on an outer side of the installation unit 2.

The pin-elastic part 523 applies an elastic force to the fixing pin 51 in a direction in which the fixing pin 51 fixes the swing unit 4 swung in the other direction. The pin-elastic part 523 has one end portion supported on the fixing bracket 521 and the other end portion supported on the fixing pin 51. The other end portion of the pin-elastic part 523 may be supported on the protrusion part 511. The pin-elastic part 523 may be disposed in the fixing bracket 521. The fixing pin 51 may be disposed in the pin-elastic part 523.

The fixing operation part 52 according to the first embodiment will be operated as described below.

First, as shown in FIG. 7, when the operator pulls the force transferring part 522 in an upward direction, the fixing pin 51 may move upward and come out of the swing fixing groove 42. Therefore, the swing unit 4 may swing in one direction. Meanwhile, the pin-elastic part 523 is pushed by the fixing pin 51 and pressed so as to have a restoring force.

As shown in FIG. 6, when the swing unit 4 swings in the other direction to a position at which the swing fixing groove 42 corresponds to the fixing pin 51, the fixing pin 51 may be moved downward due to the restoring force of the pin-elastic part 523 and inserted into the swing fixing groove. Therefore, the fixing pin 51 may fix the swing unit 4 swung in the other direction. In this case, the swing fixing groove 42 may be formed in an upper surface of the swingable body part 41. The through hole 21 may be formed in an upper surface of the installation unit 2. Meanwhile, the swing unit 4 may be swung in the other direction due to an external force applied by the operator.

Fixing Operation Part According to Second Embodiment

Figure 8:
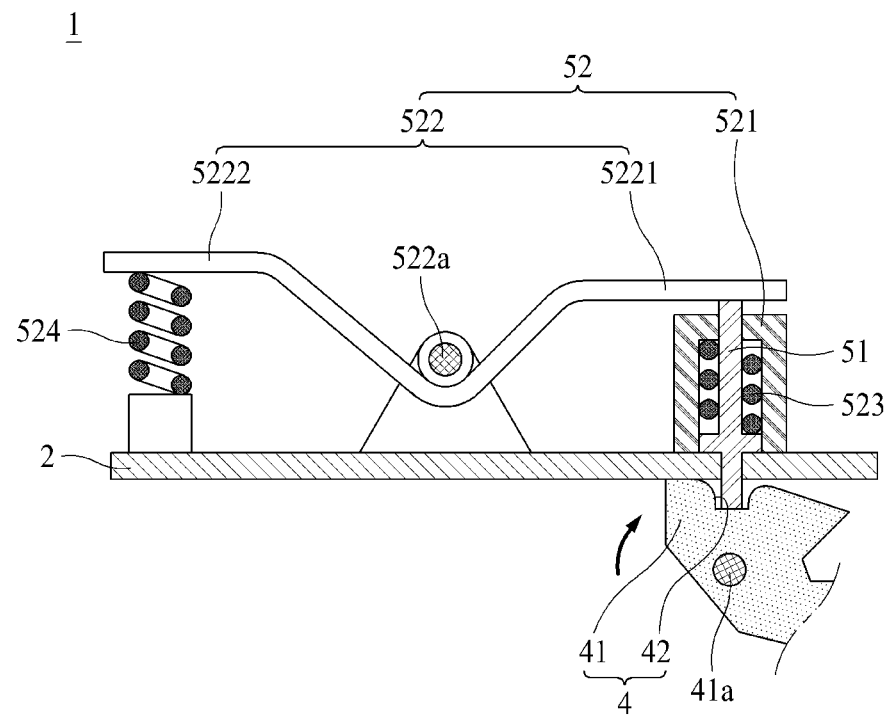
Figure 9:
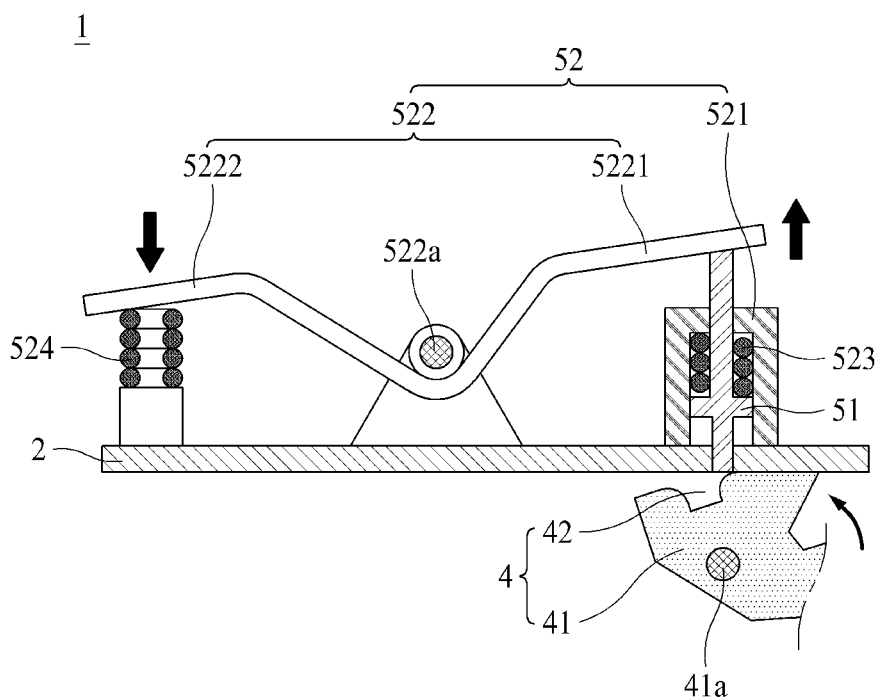

Referring to FIGS. 8 and 9, a fixing operation part 52 according to a second embodiment may include a force transferring part 522.

The force transferring part 522 is connected to a fixing pin 51. The force transferring part 522 may be formed to be swingable about a hinge shaft 522a. A movement direction of the fixing pin 51 may be changed according to a direction in which the force transferring part 522 swings about the hinge shaft 522a. In this case, the fixing pin 51 may be connected to the force transferring part 522 so that the fixing pin 51 moves according to swinging of the force transferring part 522. The force transferring part 522 may be integrated with the fixing pin 51. The force transferring part 522 may be coupled to an installation unit 2 so as to be disposed above the installation unit 2.

The force transferring part 522 may include a transfer member 5221 and an external force member 5222.

The transfer member 5221 may move the fixing pin 51 while swinging about the hinge shaft 522a. The fixing pin 51 may be connected to the transfer member 5221.

The external force member 5222 may be disposed on a side opposite to the transfer member 5221 with respect to the hinge shaft 522a.

As shown in FIG. 9, when an operator applies an external force to the external force member 5222 so that the external force member 5222 swings downward about the hinge shaft 522a, the transfer member 5221 may swing upward about the hinge shaft 522a. Therefore, the fixing pin 51 may come out of a swing fixing groove 42 while moving upward.

As shown in FIG. 8, when the swing unit 4 swings in the other direction to a position at which the swing fixing groove 42 corresponds to the fixing pin 51, the fixing pin 51 moves downward to be inserted into the swing fixing groove 42. In this process, the transfer member 5221 may swing downward, and the external force member 5222 may swing upward. In this case, the external force applied to the external force member 5222 may be removed.

The fixing operation part 52 according to the second embodiment may include a fixing bracket 521 and a pin-elastic part 523. Since the fixing bracket 521 and the pin-elastic part 523 are substantially the same as described in the above-described first embodiment, the specific descriptions thereof will be omitted.

The fixing operation part 52 according to the second embodiment may include a transfer elastic part 524. The transfer elastic part 524 applies force to the fixing pin 51 in a direction in which the fixing pin 51 fixes the swing unit 4 swung in the other direction. The transfer elastic part 524 has one end portion supported on the installation unit 2 and the other end portion supported on the force transferring part 522. Therefore, as shown in FIG. 8, when the swing unit 4 swings in the other direction to a position at which the swing fixing groove 42 corresponds to the fixing pin 51, the transfer elastic part 524 swings the force transferring part 522 about the hinge shaft 522a due to a restoring force, and thus the fixing pin 51 may be inserted into the swing fixing groove 42. The transfer elastic part 524 may swing the force transferring part 522 so that the external force member 5222 moves upward and the transfer member 5221 moves downward. In this case, the transfer elastic part 524 may be disposed between the installation unit 2 and the external force member 5222.

FIGS. 8 and 9 illustrate the fixing operation part 52 including all of the pin-elastic part 523 and the transfer elastic part 524 according to the second embodiment, but the present invention is not limited thereto. The fixing operation part 52 according to the second embodiment may include any one of the pin-elastic part 523 and the transfer elastic part 524.

The fixing operation part 52 according to the second embodiment is formed so that fixing of the swing unit 4 is released using force with which the operator presses the force transferring part 522. Therefore, in the fixing operation part 52 according to the second embodiment, the operator steps on the force transferring part 522 with his or her foot without bending down, and as shown in FIG. 5, the main body 200 can be pressed against the ground G. Unlike this, the fixing operation part 52 according to the first embodiment is formed so that fixing of the swing unit 4 is released using force with which the operator pulls the force transferring part 522. Therefore, in the fixing operation part 52 according to the first embodiment, it is hard for the operator to pull the force transferring part 522 with his or her foot without bending down, and thus the fixing operation part 52 is formed so that the operator pulls the force transferring part 522 by bending down. Therefore, when compared with the first embodiment, the fixing operation part 52 according to the second embodiment can improve easiness and convenience of an operation in which the main body 200 is pressed against the ground G.

Fixing Operation Part According to Third Embodiment

Referring to FIGS. 10 to 13, a fixing operation part 52 according to a third embodiment may include a fixing bracket 521 and a force transferring part 522.

The fixing bracket 521 is coupled to the installation unit 2. The fixing bracket 521 may be disposed above an installation unit 2. The interior of the fixing bracket 521 may be formed to be empty.

Figure 10:
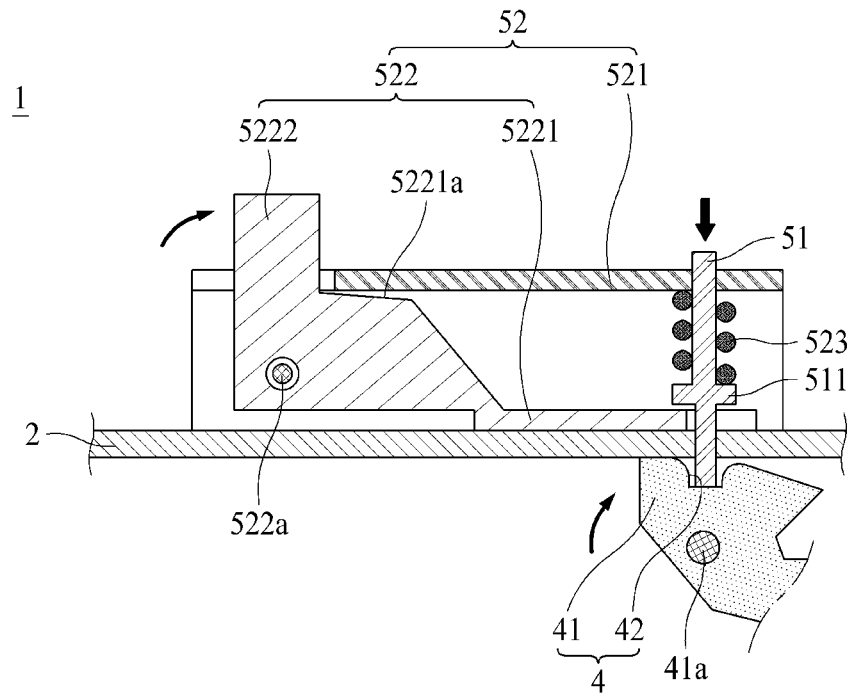
Figure 11:
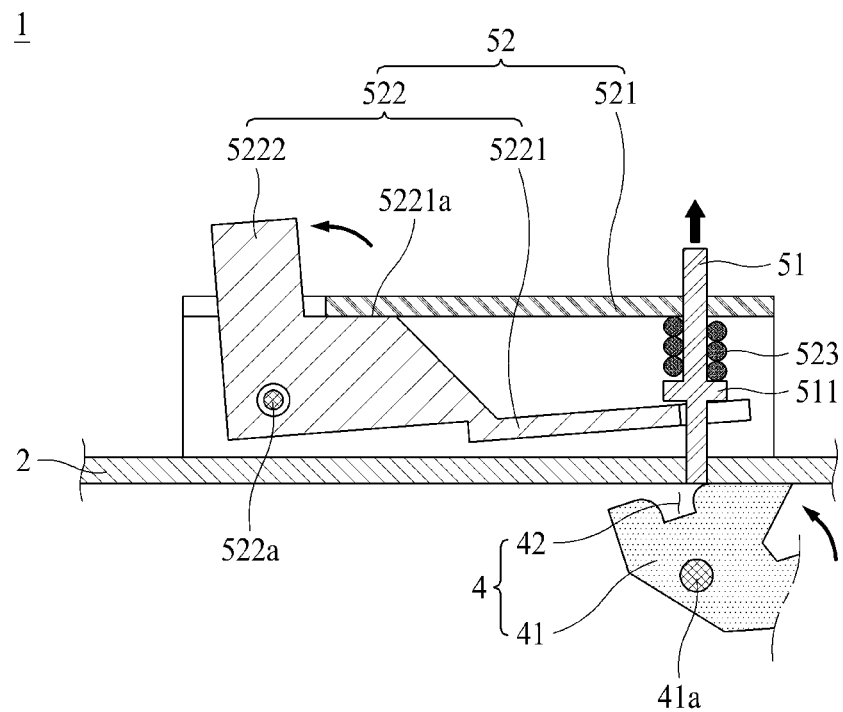

The force transferring part 522 is coupled to the fixing bracket 521 to be swingable about a hinge shaft 522a. The force transferring part 522 may be disposed to support a protrusion part 511. In this case, the force transferring part 522 may be disposed between the protrusion part 511 and the installation unit 2. Therefore, the force transferring part 522 swings about the hinge shaft 522a and moves the protrusion part 511 so as to move the fixing pin 51. In this case, a movement direction of the protrusion part 511 and the fixing pin 51 may be changed according to a swing direction in which the force transferring part 522 swings about the hinge shaft 522a. For example, as shown in FIG. 11, when the force transferring part 522 swings about the hinge shaft 522a in a counter-clockwise direction, the protrusion part 511 and the fixing pin 51 may move upward. Therefore, the fixing pin 51 may come out of a swing fixing groove 42. As shown in FIG. 10, when the force transferring part 522 swings about the hinge shaft 522a in a clockwise direction, the protrusion part 511 and the fixing pin 51 may move downward. Therefore, the fixing pin 51 may be inserted into the swing fixing groove 42.

The force transferring part 522 may include a transfer member 5221 and an external force member 5222.

Figure 12:
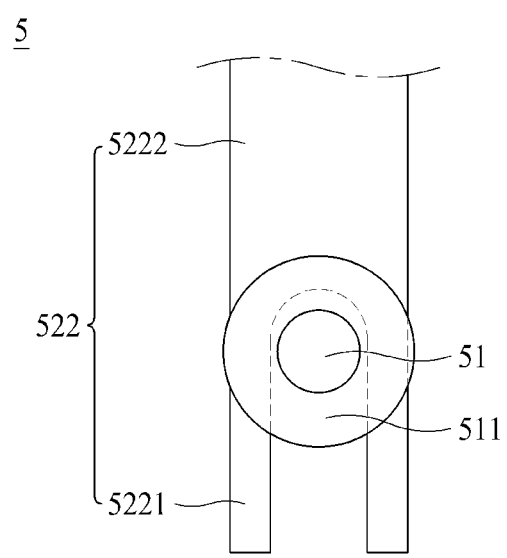
FIG. 12 is a schematic plan view illustrating a part of a fixing unit of the auxiliary wheel for a lawn mower according to the present invention.

The transfer member 5221 is disposed between the protrusion part 511 and the installation unit 2 and supports the protrusion part 511. The transfer member 5221 swings about the hinge shaft 522a and moves the protrusion part 511. As shown in FIG. 12, the transfer member 5221 that supports the protrusion part 511 is branched into two and may extend to protrude through the protrusion part 511. Therefore, the transfer member 5221 may increase a support area that supports the protrusion part 511. Further, the protrusion part 511 may easily move while the transfer member 5221 swings about the hinge shaft 522a.

The external force member 5222 may swing the transfer member 5221 about the hinge shaft 522a. The external force member 5222 and the transfer member 5221 are formed by extending in different directions with respect to the hinge shaft 522a. Therefore, an operation in which the operator applies an external force to the external force member 5222 can be facilitated. When the external force is applied to the external force member 5222, the transfer member 5221 may swing the hinge shaft 522a about the hinge shaft 522a so that the transfer member 5221 is spaced apart from the installation unit 2. Therefore, since the transfer member 5221 lifts the protrusion part 511, the fixing pin 51 may come out of the swing fixing groove 42. Meanwhile, a contact surface 5221a may be formed in the transfer member 5221. When the contact surface 5221a swings so that the transfer member 5221 is spaced apart from the installation unit 2, the contact surface 5221a may come into contact with the fixing bracket 521. Therefore, the contact surface 5221a is supported on the fixing bracket 521 to prevent the transfer member 5221 from swinging more toward the fixing bracket 521. Therefore, the contact surface 5221a may prevent damage to the transfer member 5221 when the transfer member 5221 swings excessively toward the fixing bracket 521.

The fixing operation part 52 according to the third embodiment may include a pin-elastic part 523.

Figure 13:
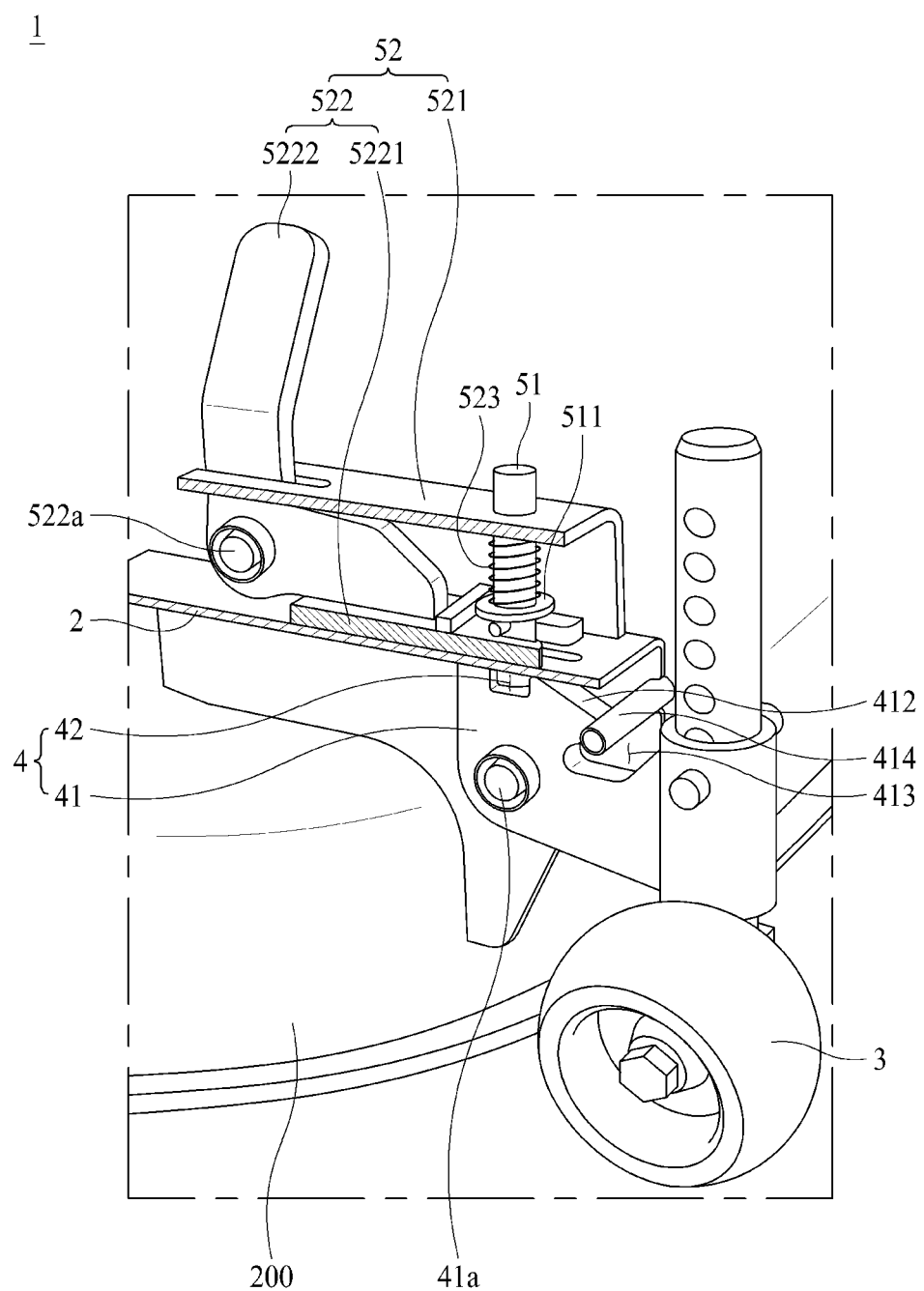
FIG. 13 is a schematic cut-out perspective view illustrating a cut-out part of the fixing unit of the auxiliary wheel for a lawn mower according to the present invention.

The pin-elastic part 523 elastically presses the protrusion part 511. The pin-elastic part 523 may be disposed between the fixing bracket 521 and the protrusion part 511. The pin-elastic part 523 elastically presses the protrusion part 511 in a direction in which the fixing pin 51 fixes the swing unit 4 swung in the other direction. As shown in FIG. 11, when the transfer member 5221 swings to be spaced apart from the installation unit 2, the pin-elastic part 523 is pushed by the protrusion part 511 and pressed. As shown in FIGS. 10 and 13, when the swing fixing groove 42 is disposed at a position corresponding to the fixing pin 51, the pin-elastic part 523 stretches due to a restoring force to push and move the protrusion part 511. Therefore, the protrusion part 511 may move the fixing pin 51 so that the fixing pin 51 is inserted into the swing fixing groove 42 and swing the transfer member 5221 about the hinge shaft 522a so that the transfer member 5221 is supported on the installation unit 2. In this case, the pin-elastic part 523 may move the protrusion part 511 downward.

It has been heretofore described that the force transferring part 522 supports the protrusion part 511 and moves the protrusion part 511 to move the fixing pin 51. However, the fixing operation part 52 according to the third embodiment may allow the fixing pin 51 to be directly coupled to the force transferring part 522 without the protrusion part 511. The fixing pin 51 may be coupled to the transfer member 5221. In this case, when an external force is applied to the external force member 5222, the transfer member 5221 swings about the hinge shaft 522a, and thus the fixing pin 51 may move upward. Therefore, the pin-elastic part 523 is pressed, and the fixing pin 51 may come out of the swing fixing groove 42. When the external force applied to the external force member 5222 is removed, and the swing fixing groove 42 is disposed at a position corresponding to the fixing pin 51, the pin-elastic part 523 may stretch and move the fixing pin 51 downward. Therefore, the transfer member 5221 is supported on the installation unit 2, and the fixing pin 51 may be inserted into the swing fixing groove 42. The force transferring part 522 and the fixing pin 51 may be formed integrally.

The fixing operation part 52 according to the third embodiment releases fixing of the swing unit 4 using force with which the operator pushes the force transferring part 522 for swinging. Therefore, in the fixing operation part 52 according to the third embodiment, when the operator steps on the force transferring part 522 with his or her foot without bending down, as shown in FIG. 5, the main body 200 can be pressed against the ground G. Therefore, when compared with the first embodiment, the fixing operation part 52 according to the third embodiment can improve easiness and convenience of an operation in which the main body 200 is pressed against the ground G.

Fixing Operation Part According to Fourth Embodiment

Referring to FIGS. 2 and 14 to 16, when compared with the above-described embodiments, a fixing operation part 52 according to a fourth embodiment has a difference in that the fixing operation part 52 is installed on a lateral surface of an installation unit 2. An entirety of a fixing unit 5 may be disposed on a lateral side of the installation unit 2. The fixing operation part 52 according to the fourth embodiment may include a force transferring part 522 and a transfer elastic part 524.

The force transferring part 522 may be coupled to a lateral side of the installation unit 2 to be swingable about a hinge shaft 522a. A fixing pin 51 may be coupled to the force transferring part 522. A swing fixing groove 42 may be formed in a lateral surface of a swingable body part 41. In this case, the fixing pin 51 may be moved to be inserted into the swing fixing groove 42 through a through hole 21 formed in a lateral side of the installation unit 2 or to come out of the swing fixing groove 42. The force transferring part 522 and the fixing pin 51 may be formed integrally.

Figure 15:
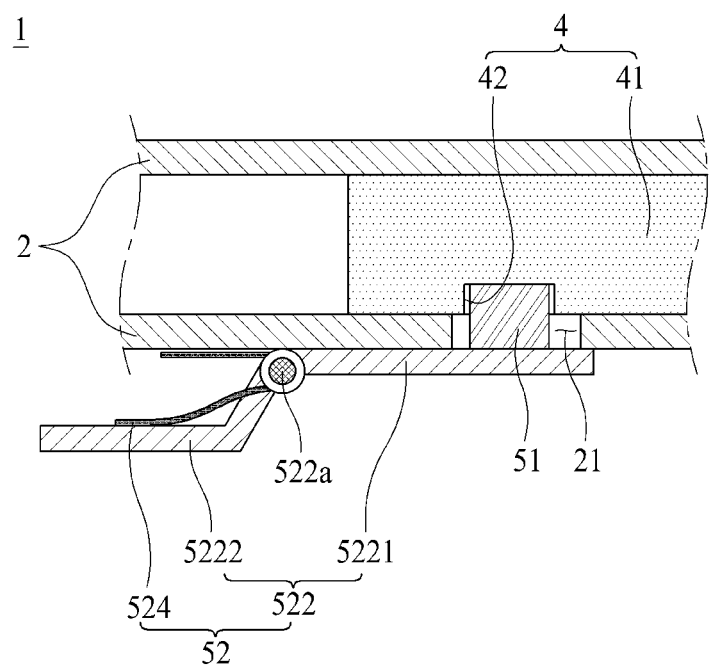
FIGS. 15 and 16 are schematic planar cross-sectional views illustrating the auxiliary wheel for a lawn mower according to the present invention taken along line II-II in FIG. 14.
Figure 16:
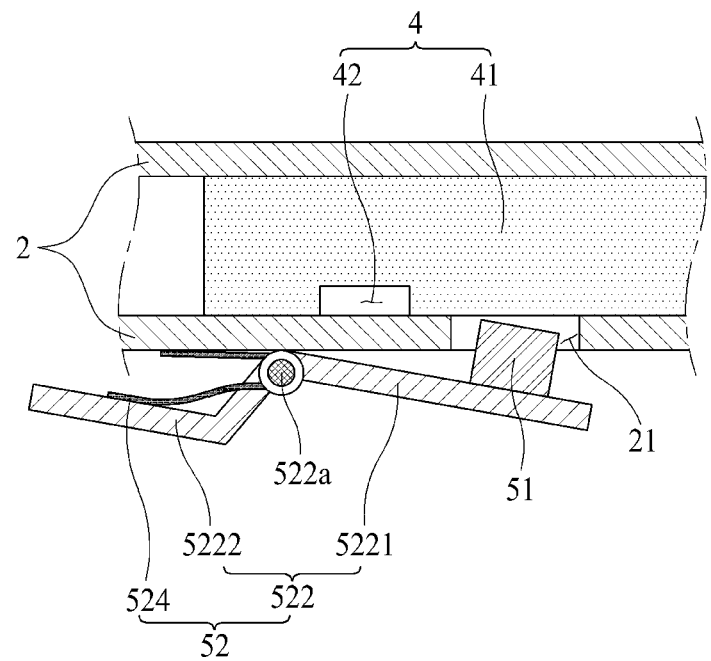
Figure 17:
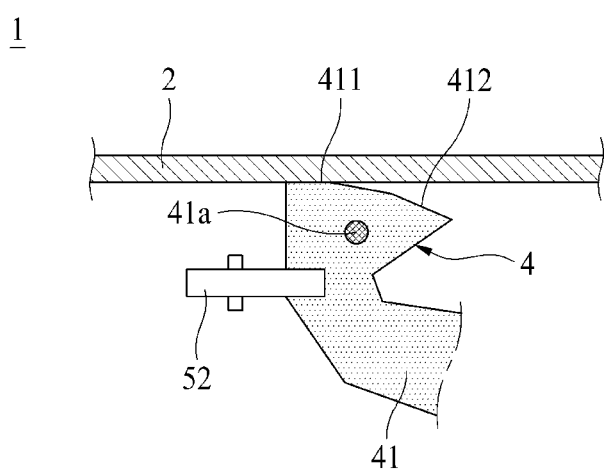
FIG. 17 is a conceptual side view illustrating an embodiment in which the fixing operation part of the auxiliary wheel for a lawn mower according to the present invention is coupled to a lateral surface of the installation unit under a swing shaft.

FIGS. 15 and 16 illustrate the swing fixing groove 42 formed in the form of a groove formed in a lateral surface of the swingable body part 41, but the present invention is not limited thereto. The swing fixing groove 42 may be formed in the form of a hole that passes through the swingable body part 41 from one surface thereof to the other surface thereof.

The force transferring part 522 may include a transfer member 5221 and an external force member 5222.

The transfer member 5221 swings about the hinge shaft 522a and moves the fixing pin 51. The fixing pin 51 may be coupled to the transfer member 5221.

The external force member 5222 may be coupled to the transfer member 5221. The external force member 5222 and the transfer member 5221 may be formed to extend in the different directions with respect to the hinge shaft 522a. The external force member 5222 and the transfer member 5221 may be formed integrally.

The transfer elastic part 524 applies force to the force transferring part 522 in a direction in which the fixing pin 51 is inserted into the swing fixing groove 42. The transfer elastic part 524 has one end supported on a lateral surface of the installation unit 2 and the other end supported on the external force member 5222. The transfer elastic part 524 may be formed as a torsion spring.

The fixing operation part 52 according to the fourth embodiment may be operated as described below.

First, as shown in FIG. 16, when the operator applies force to the external force member 5222 to swing the external force member 5222 toward a lateral surface of the installation unit 2, the transfer member 5221 may swing to be spaced apart from the lateral surface of the installation unit 2. Therefore, the fixing pin 51 comes out of the swing fixing groove 42 so that fixing of the swing unit 4 may be released. Therefore, the swing unit 4 may swing in one direction. Meanwhile, the transfer elastic part 524 is pushed by the external force member 5222 and pressed so as to have a restoring force.

As shown in FIG. 15, when the swing unit 4 swings in the other direction, and the swing fixing groove 42 is disposed at a position corresponding to the fixing pin 51, the force transferring part 522 may swing so that the external force member 5222 is spaced apart from a lateral surface of the installation unit 2 due to a restoring force of the transfer elastic part 524 and the transfer member 5221 moves toward a lateral surface of the installation unit 2. Therefore, the fixing pin 51 moves toward a lateral surface of the swingable body part 41 to be inserted into the swing fixing groove 42. Therefore, the fixing pin 51 may fix the swing unit 4 swung in the other direction. Meanwhile, the external force applied to the external force member 5222 may be removed.

The fixing operation part 52 according to the fourth embodiment may be disposed above the swing shaft 41a. In this case, the swing fixing groove 42 may be disposed above the swing shaft 41a of the swingable body part 41.

The fixing operation part 52 according to the fourth embodiment releases fixing of the swing unit 4 using force with which an operator presses the force transferring part 522 toward a lateral surface of the installation unit 2 for swinging. Therefore, in the fixing operation part 52 according to the fourth embodiment, when the operator steps on the force transferring part 522 with his or her foot without bending down, as shown in FIG. 5, the main body 200 can be pressed against the ground G. Therefore, when compared to the first embodiment, the fixing operation part 52 according to the fourth embodiment improves easiness and convenience of an operation in which the main body 200 is pressed against the ground G.

Figure 14:
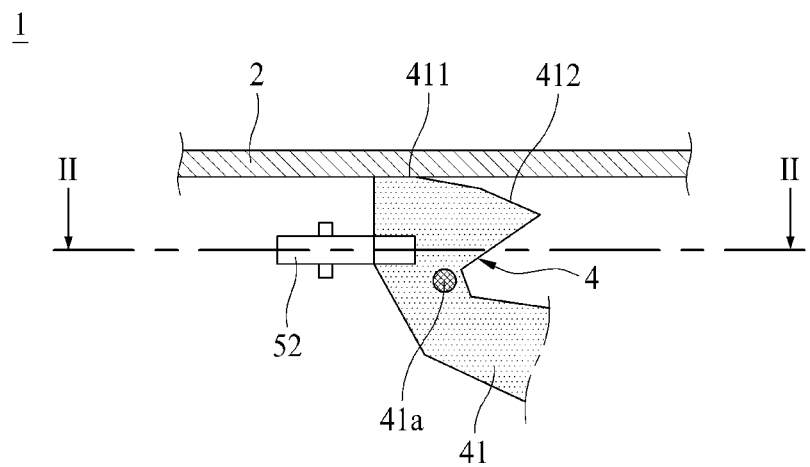
FIG. 14 is a conceptual side view illustrating an embodiment in which a fixing operation part of the auxiliary wheel for a lawn mower according to the present invention is coupled to a lateral surface of an installation unit.

Meanwhile, in the case in which the fixing operation part 52 according to the fourth embodiment is applied, as shown in FIG. 14, a stop surface 411 and a limiting surface 412 may be formed on an upper surface of the swingable body part 41. An inclined surface may be additionally formed between the stop surface 411 and the limiting surface 412. Therefore, the swing unit 4 may be prevented from swinging excessively in the one direction or the other direction and easily swing in the one direction or the other direction.

Fixing Operation Part According to Fifth Embodiment

Referring to FIGS. 14 to 17, a fixing operation part 52 according to a fifth embodiment may be coupled to a lateral surface of an installation unit 2 to be disposed below a swing shaft 41a. In this case, the swing fixing groove 42 may be formed below the swing shaft 41a of the swingable body part 41. When compared with the fixing operation part 52 according to the fourth embodiment, the fixing operation part 52 according to the fifth embodiment has a difference in a relative position with the swing shaft 41a. Therefore, those skilled in the art to which the present invention belongs will clearly understand the structure, operation relationship, and the like of the fixing operation part 52 according to the fifth embodiment from the descriptions of the fixing operation part 52 according to the fourth embodiment, and thus specific descriptions of the fixing operation part 52 according to the fifth embodiment will be omitted.

Heretofore, various embodiments of the fixing operation part 52 have been described.

In the first to third embodiments, the fixing unit 5 is disposed on an upper portion of the installation unit 2, and the swing fixing groove 42 may be formed in an upper surface of the swingable body part 41. However, the present invention is not limited thereto, the fixing unit 5 may be disposed on a lateral surface of the installation unit 2, and the swing fixing groove 42 may be formed in a lateral surface of the swingable body part 41.

In the fourth to fifth embodiments, the fixing unit 5 is disposed on a lateral surface of the installation unit 2, and the swing fixing groove 42 may be formed in a lateral surface of the swingable body part 41. However, the present invention is not limited thereto, the fixing unit 5 may be disposed on an upper portion of the installation unit 2, and the swing fixing groove 42 may be formed in an upper surface of the swingable body part 41.

The above-described present invention is not limited to the above-described embodiments and the accompanying drawings, and it will be apparent to those skilled in the art to which the present invention belongs that various substitutions, changes, and alterations may be made herein without departing from the scope of the present invention.

The invention claimed is:

1. An auxiliary wheel for a lawn mower, comprising:
an installation unit coupled to a main body of a lawn mower;
a swing unit coupled to the installation unit to be swingable in one direction or the other direction;
a wheel unit connected to the swing unit to be swingable with the swing unit; and
a fixing unit installed outside the installation unit and configured to fix the swing unit swung in the other direction,
wherein when the wheel unit swings in the one direction, the main body is pressed against a ground, and when the wheel unit swings in the other direction, the main body is spaced apart from the ground, and
wherein the swing unit includes:
a swingable body part, which is coupled to the installation unit to be swingable about a swing shaft in the one direction or the other direction and has one end portion connected with the wheel unit, and
a swing fixing groove formed in the swingable body part, and
wherein the fixing unit includes a fixing pin inserted into the swing fixing groove to fix the swing unit swung in the other direction or coming out of the swing fixing groove to release fixing of the swing unit.

2. The auxiliary wheel for a lawn mower of claim 1,
wherein the fixing unit includes a fixing operation part and
wherein the fixing operation part moves the fixing pin to fix the swing unit swung in the other direction or release fixing of the swing unit.

3. The auxiliary wheel for a lawn mower of claim 2,
wherein the fixing operation part includes:
a fixing bracket coupled to the installation unit;
a force transferring part having a ring shape and connected to the fixing pin; and
a pin-elastic part that applies an elastic force to the fixing pin in a direction in which the fixing pin fixes the swing unit swung in the other direction,
wherein the pin-elastic part has one end portion supported on the fixing bracket and the other end portion supported on the fixing pin.

4. The auxiliary wheel for a lawn mower of claim 2,
wherein the fixing operation part includes a force transferring part connected to the fixing pin,
wherein the force transferring part swings about a hinge shaft.

5. The auxiliary wheel for a lawn mower of claim 4,
wherein the fixing operation part includes:
a fixing bracket coupled to the installation unit; and
a pin-elastic part that applies force to the fixing pin in a direction in which the fixing pin fixes the swing unit swung in the other direction,
wherein the pin-elastic part has one end portion supported on the fixing bracket and the other end portion supported on the fixing pin.

6. The auxiliary wheel for a lawn mower of claim 4,
wherein the fixing operation part includes a transfer elastic part that applies force to the fixing pin in a direction in which the fixing pin fixes the swing unit swung in the other direction, and
wherein the transfer elastic part has one end portion supported on the installation unit and the other end portion supported on the force transferring part.

7. The auxiliary wheel for a lawn mower of claim 1,
wherein a stop surface is formed on an upper surface of the swingable body part, and when the swing unit swings to a position at which the swing fixing groove corresponds to the fixing pin, the stop surface is in surface contact with an upper portion of the installation unit so that the swing unit does not swing over the position at which the swing fixing groove corresponds to the fixing pin in the other direction.

8. The auxiliary wheel for a lawn mower of claim 1, wherein a limiting surface is formed on an upper surface of the swingable body part, and when the swing unit swings to a predetermined position, the limiting surface is in surface contact with an upper portion of the installation unit so that the swing unit does not swing excessively in the one direction.

9. The auxiliary wheel for a lawn mower of claim 1, wherein the swing unit includes:

a stop groove formed in the swingable body part; and a stop bar coupled to the installation unit, and wherein when the swing unit swings to a position at which the swing fixing groove corresponds to the fixing pin, the stop bar is in contact with the swingable body part in the stop groove so that the swing unit does not swing over a position at which the swing fixing groove corresponds to the fixing pin in the other direction.

10. The auxiliary wheel for a lawn mower of claim 1, wherein the swing unit includes:

a stop groove formed in the swingable body part; and a stop bar coupled to the installation unit, and wherein when the swing unit swings to a predetermined position, the stop bar is in contact with the swingable body part in the stop groove so that the swing unit does not swing excessively in the one direction.

11. The auxiliary wheel for a lawn mower of claim 1, wherein:

the swing fixing groove is formed in an upper surface of the swingable body part;

the fixing unit is installed on an upper portion of the installation unit; and wherein a through hole corresponding to the fixing pin is formed in an upper surface of the installation unit.

12. The auxiliary wheel for a lawn mower of claim 1, wherein:

the swing fixing groove is formed in a lateral surface of the swingable body part;

the fixing unit is installed on a lateral surface of the installation unit; and wherein a through hole corresponding to the fixing pin is formed in a lateral surface of the installation unit.

13. The auxiliary wheel for a lawn mower of claim 12, wherein the swing fixing groove is formed at a higher level than the swing shaft in the swingable body part.

14. The auxiliary wheel for a lawn mower of claim 12, wherein the swing fixing groove is formed at a lower level than the swing shaft in the swingable body part.

15. The auxiliary wheel for a lawn mower of claim 2, wherein the fixing operation part includes:

a fixing bracket coupled to the installation unit; and a force transferring part coupled to be swingable about a hinge shaft of the fixing bracket, wherein a protrusion part supported on the force transferring part is coupled to the fixing pin, and the force transferring part swings the hinge shaft and moves the protrusion part to move the fixing pin.

16. The auxiliary wheel for a lawn mower of claim 15, wherein the force transferring part includes:

a transfer member disposed between the protrusion part and the installation unit to support the protrusion part; and an external force member that swings the transfer member about the hinge shaft, wherein the external force member allows the transfer member to swing about the hinge shaft so that the transfer member is spaced apart from the installation unit when an external force is applied, and the transfer member swings to be spaced apart from the installation unit to move the protrusion part and moves the protrusion part so that the fixing pin comes out of the swing fixing groove.

17. The auxiliary wheel for a lawn mower of claim 16, wherein:

the fixing operation part includes a pin-elastic part that elastically presses the protrusion part, when the transfer member swings to be spaced apart from the installation unit, the pin-elastic part is pushed by the protrusion part and pressed, when the swing fixing groove is disposed at a position corresponding to the fixing pin, the pin-elastic part stretches due to a restoring force and pushes and moves the protrusion part, and the protrusion part moves the fixing pin so that the fixing pin is inserted into the swing fixing groove while being pushed and moved due to the restoring force of the pin-elastic part and allows the transfer member to swing about a hinge shaft so that the transfer member is supported on the installation unit.

18. The auxiliary wheel for a lawn mower of claim 2, wherein:

the fixing operation part includes a fixing bracket coupled to the installation unit, a force transferring part coupled to be swingable about a hinge shaft of the fixing bracket, and a pin-elastic part disposed between the fixing pin and the fixing bracket;

the force transferring part includes a transfer member connected with the fixing pin and an external force member coupled to the transfer member;

when an external force is applied to the external force member, the transfer member swings about the hinge shaft to move the fixing pin and moves the fixing pin upward so that the pin-elastic part is pressed and the fixing pin comes out of the swing fixing groove; and when an external force applied to the external force member is removed and the swing fixing groove is disposed at a position corresponding to the fixing pin, the pin-elastic part stretches to move the fixing pin and moves the fixing pin downward so that the transfer member is supported on the installation unit and the fixing pin is inserted into the swing fixing groove.

\* \* \* \* \*